United States Patent [19]

Apolzer et al.

[11] Patent Number: 4,747,441
[45] Date of Patent: May 31, 1988

[54] FOLDABLE COVER ASSEMBLY

[76] Inventors: Donald G. Apolzer, 206-286 Green Ave. West; Charles H. Richards, 1415 Balfour St., both of Penticton, Canada

[21] Appl. No.: 878,719
[22] Filed: Jun. 25, 1986
[51] Int. Cl.$^4$ .............................................. E06B 3/94
[52] U.S. Cl. ................................... 160/84.1; 160/232; 296/100
[58] Field of Search ................. 160/84 R, 32, 35, 44, 160/31, 231 A, 232, 229 R; 296/98, 100

[56] References Cited

U.S. PATENT DOCUMENTS

| | | | |
|---|---|---|---|
| 2,411,902 | 12/1946 | Skelly | 160/232 |
| 2,771,319 | 11/1956 | Renquist | 296/100 |
| 3,148,724 | 9/1964 | Chieger et al. | 160/231 A X |
| 3,403,720 | 10/1968 | Ahleen | 160/231 A |
| 3,756,650 | 9/1973 | Michel | 296/100 |
| 3,768,858 | 10/1973 | Boismier | 296/100 |
| 3,820,840 | 6/1974 | Forsberg | 296/100 |
| 3,936,077 | 2/1976 | Bliek | 296/100 X |
| 3,986,749 | 10/1976 | Hull et al. | 296/98 X |
| 4,210,361 | 7/1980 | Marvin et al. | 296/100 X |
| 4,273,377 | 6/1981 | Alexander | 296/100 |
| 4,547,014 | 10/1985 | Wicker | 160/84 R X |

Primary Examiner—Ramon S. Britts
Assistant Examiner—David M. Purol
Attorney, Agent, or Firm—Bull, Housser & Tupper

[57] ABSTRACT

A foldable cover assembly is particularly adapted for pick-up trucks and has a plurality of slat members with a longitudinal slot extending along each end. Each slot communicates with a more extensive cavity. A plurality of hinge members connect the slat members together. The hinge members are flexible and resilient, having a center portion and relatively thin flange portions extending longitudinally along each end of the center portion. The hinge members have enlarged, elongated portions extending along outer ends of the flange portions. The flange portions and protrusions are shaped so the flange portions extend through the slots of the slat members, while the protrusions are retained in the cavities of the slat members. A pair of guide members are positioned in parallel, spaced-apart relationship. The guide members have inner portions for slidably receiving sides of the slat members and the hinge members thereon. A plurality of retainers slidably connect alternating hinge members to the guide members. Preferably a pair of flap members are hingedly connected to each guide member for covering sides of the slat members and the hinge members when the cover assembly is unfolded.

17 Claims, 4 Drawing Sheets

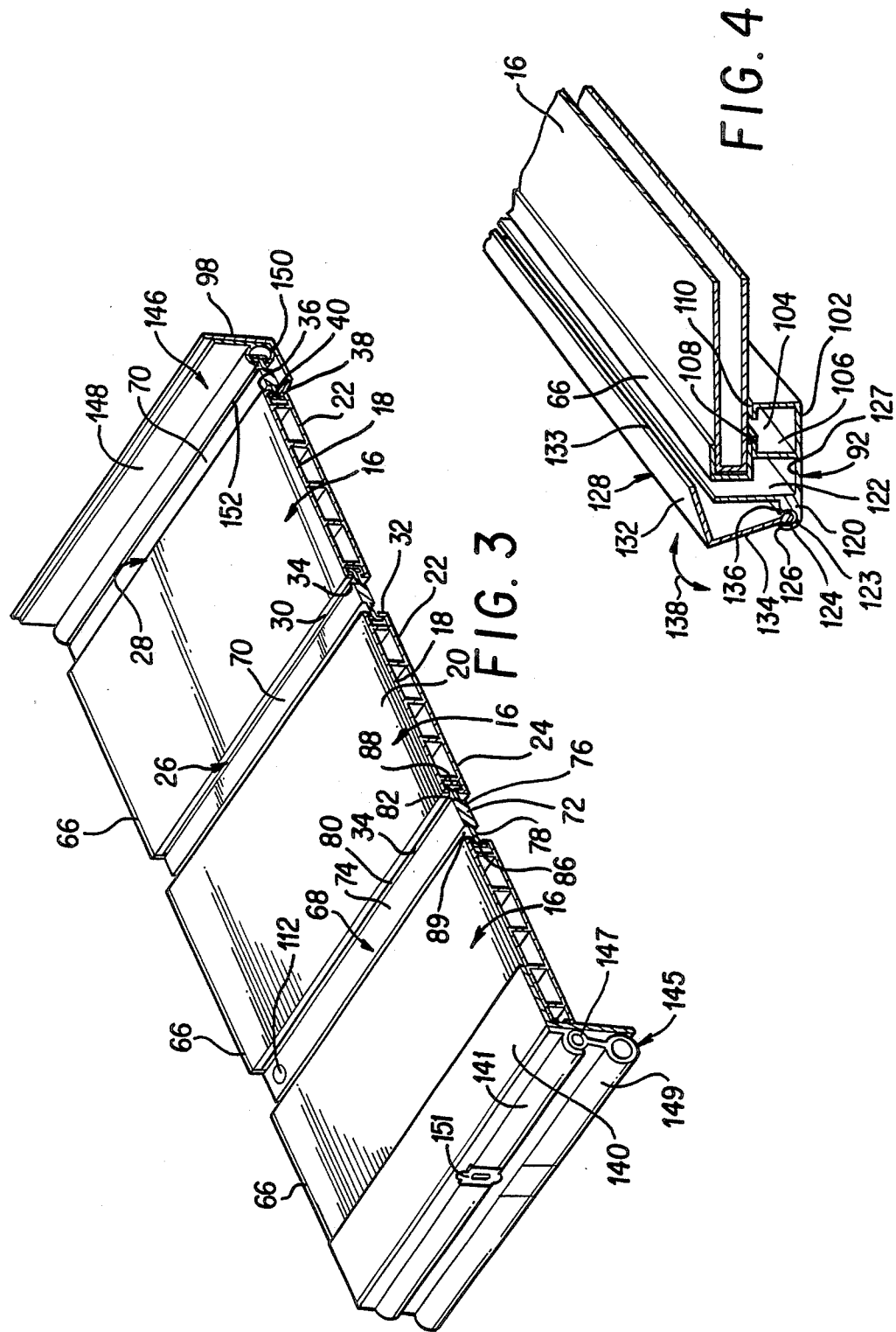

FOLDABLE COVER ASSEMBLY

FIELD OF THE INVENTION

The invention relates to a foldable cover particularly adapted for the backs of pick-up trucks.

BACKGROUND OF THE INVENTION

Pick-up trucks are a popular and relatively inexpensive means of transportation for passengers and for carrying small loads. However, the cargo area is an open box and is therefore subject to adverse weather while providing no security against theft. In addition, fuel economy is reduced due to the air drag effects on the open box.

Various attempts have been made to provide suitable covers for the backs of pick-up trucks. These range from a simple tarpaulin to more complicated rigid covers including folding types. Some earlier types of covers do not provide the degree of protection desired for the cargo or may be relatively complex or expensive. Likewise, some of the earlier covers do not provide the degree of access desired to load the truck or unload it.

The problem of covering open areas in vehicles has been recognised for some time and attempted solutions include the flexible cover for vehicles shown in U.S. Pat. No. 1,950,927 to McMillan. This patent shows a cover for an automobile including a plurality of slats connected together by flexible or hinged joints. The sides of the units are covered by fixed moldings. However, the cover requires a relatively intricate roller system to remove the cover. Pick-up trucks do not have a suitable location for such a roller unit without taking up valuable cargo area.

U.S. Pat. No. 2,140,960 to Kercher shows a sliding top for trucks. The unit is rigid and requires considerable room to open. Furthermore, the cover must be relatively heavy in order to provide the degree of rigidity required to support the top when it opens.

U.S. Pat. No. 2,942,658 to Wilson shows a foldable wall structure for buildings. The structure employs high hoods to provide protection at the sides of the cover while allowing clearance for the folded cover. This would be unsuitable for pick-up trucks where extensions to the sides of the box would be necessary, thus increasing the height for loading as well as adversely affecting the weight and appearance of the unit.

U.S. Pat. No. 3,570,579 to Matsushima et al shows a sliding cover consisting of a plurality of cover pieces linked with hinges. The assembly can be housed in the cabinet covered by the device.

Other patents of general interest include U.S. Pat. Nos. 3,140,563 to Allen; 1,696,208 to Marshall; 2,368,936 to McGehee; and 1,981,241 to McWilliams.

Such prior art does not reveal a cover having all the desired features for a pick-up truck. The cover should be capable of being unfolded or retracted without impinging upon the cargo area of the truck. Furthermore, it should offer the required degree of protection without being subject to lifting or other adverse effects due to wind at highway speeds. It should be simple so that it is reliable and can be made and sold as economically as possible.

SUMMARY OF THE INVENTION

A foldable cover assembly according to the invention comprises a plurality of slat members having a longitudinal slot extending along each end. Each slot communicates with a more extensive cavity. A plurality of flexible hinge means fit between the slat members and connect together the slat members. Each of the hinge means is flexible and resilient and has a centre portion with relatively thin flange portions extending longitudinally along each end. There are enlarged, elongated portions extending along outer ends of the flange portions. The flange portions and enlarged portions are shaped so the flange portions can extend through the slots of the slat members, while the protrusions are retained in the cavities of the slat members. A pair of elongated guide means are positioned in parallel, spaced-apart relationship. The guide means have inner portions for slidably receiving sides of the slat members and the hinge members thereon. A plurality of retaining means slidably connect the hinge means to the guide means. Alternating hinge means have one said retaining means near each side thereof so said alternating hinge means are slidably held against the guide means. Hinge means between said alternating hinge means are free to fold away from the guide means.

Preferably there is a flap means hingedly connected to each said guide means for covering sides of the slat members and hinge means when the cover assembly is unfolded and for hinging away from the slat members and the hinge means to permit folding of the assembly.

BRIEF DESCRIPTION OF THE DRAWINGS

In the drawings:

FIG. 3 is a simplified isometric view of the cover shown in FIGS. 1 and 2 with one side thereof broken away;

FIG. 4 is a fragmentary, enlarged isometric view of one of the guide channels, a flap member and a portion of one of the slat members of the assembly shown in FIGS. 1 and 2;

DESCRIPTION OF THE PREFERRED EMBODIMENTS

Figure 1:
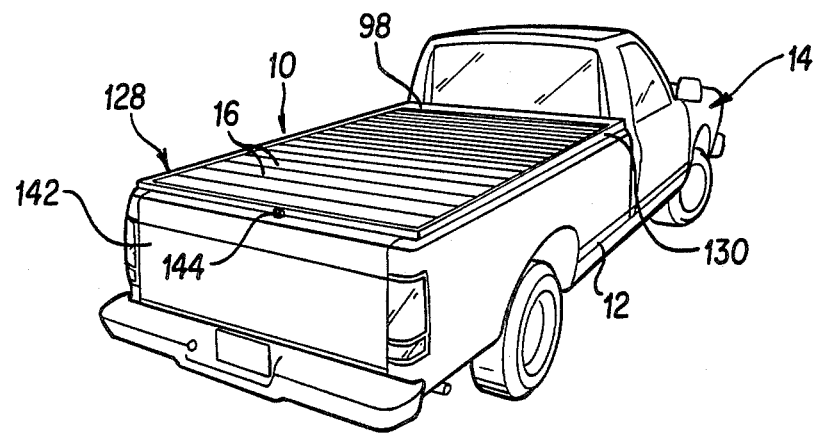
FIG. 1 is an upper, rear perspective view of a combination including a pick-up truck and a foldable cover assembly according to an embodiment of the invention, showing the cover unfolded and covering the box of the pick-up truck.

Referring firstly to FIG. 1, this shows a foldable cover assembly 10 installed on the box 12 of a pick-up truck 14. The assembly includes a plurality of slat members 16 which are co-planar and juxtaposed to cover the box 12 when the cover assembly is folded as shown in FIG. 1. The slat members are shown in better detail in FIG. 3 where, for simplicity and clarity, the number of slat members 16 has been reduce to three. In fact, as may be observed in FIG. 1, there are usually a dozen slat members or more on an actual assembly. In FIG. 3, the right side of the slat members and associated parts, those closest to the observer, have been broken away to show interior construction. As may be seen, each of the slat members is hollow, having a relatively thin top sheet 18 forming top surface 20 of each slat member and a similar bottom sheet 22 forming bottom surface 24. Since the slat members 16 are identical, the reference numerals are dispersed among the various slat members shown for clarity.

Each slat member has a back end 26 and a front end 28. There is a flange-like end portion 30 extending perpendicularly from top sheet 18 at end 26 and a corresponding end portion 32 extending perpendicularly from bottom sheet 22. The end portions at end 26 extend towards each other and are separated by a relatively narrow slot 34, shown better in FIG. 5 which illustrates the positions of the slat members when the cover assembly is partially folded. Similarly, the front end 28 of each of the slat members 16 has end portions 36 and 38 on opposite sides of slot 40. The end portions extend along each end of all the slot members.

Again referring to FIG. 5, each of the slat members 16 in this embodiment has a plurality of interior ribs 42, 46, 48, 50 and 52 dividing the hollow interior of each slat member into a plurality of interior cavities 54, 56, 58, 60, 62 and 64. As may be seen, slot 40 communicates with substantially more extensive cavity 54, while slot 34 similarly communicates with cavity 64. As described thus far, each panel 16 is, in the preferred embodiment, a single unitary extrusion. The sides are closed by channel shaped side members 66 shown best in FIGS. 3 and 4. These may be connected using a suitable adhesive.

Assembly 10 also includes a plurality of flexible hinge means or hinge members arranged in alternating sets of hinge members 68 and 70. The hinge members do not show in FIG. 1 due to the scale, but, as may be seen in FIGS. 3 and 5, every second hinge member is a hinge member 68, whlie the remaining members are members 70. An exception is the foremost hinge member which is a member 70 as seen to the right of FIG. 3. The differences between the two members are described below.

Figure 8:
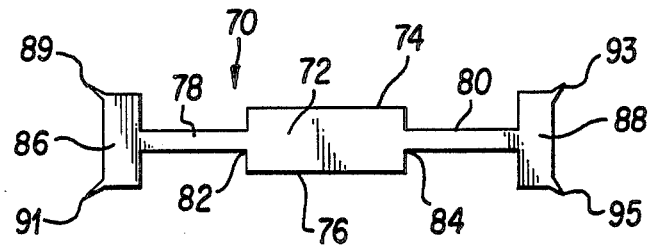
FIG. 8 is an end view of one of the hinge members.

Firstly, referring to the member 70 shown in FIG. 8, each hinge member is flat when undeformed. Each has a centre portion 72 which is flat and rectangular in section. The centre portion has a flat top 74 and a flat bottom 76 which is parallel to the top. Substantially thinner flange portions 78 and 80 extend outwardly from the centre portion parallel to the top 74 and bottom 76, when the hinge members are undeformed, and extend longitudinally along front end 82 and rear end 84 of the centre portion. Each of the hinge members also has enlarged portions 86 and 88 seen best in FIG. 8. These enlarged portions extend along outer ends of the flange portions 78 and 80. They may be seen to be flat in the dimension perpendicular to the flatness of the flange portions and the centre portion. It may also be seen in FIGS. 3 and 5 that the flange portions and enlarged portions are shaped so the flange portions extend through the slots 34 and 40 of the slat members, while the enlarged portions are retained in interior cavities 54 and 64. The hinge members thus serve to connect the slat members 16 together. As shown in FIG. 8 there are sealing projections 89, 91, 93 and 95 along the outer corners of enlarged portions 86 and 88. These serve to weather proof the joints between the hinge members and slat members by sealing within cavities 54 and 64.

Figure 5:
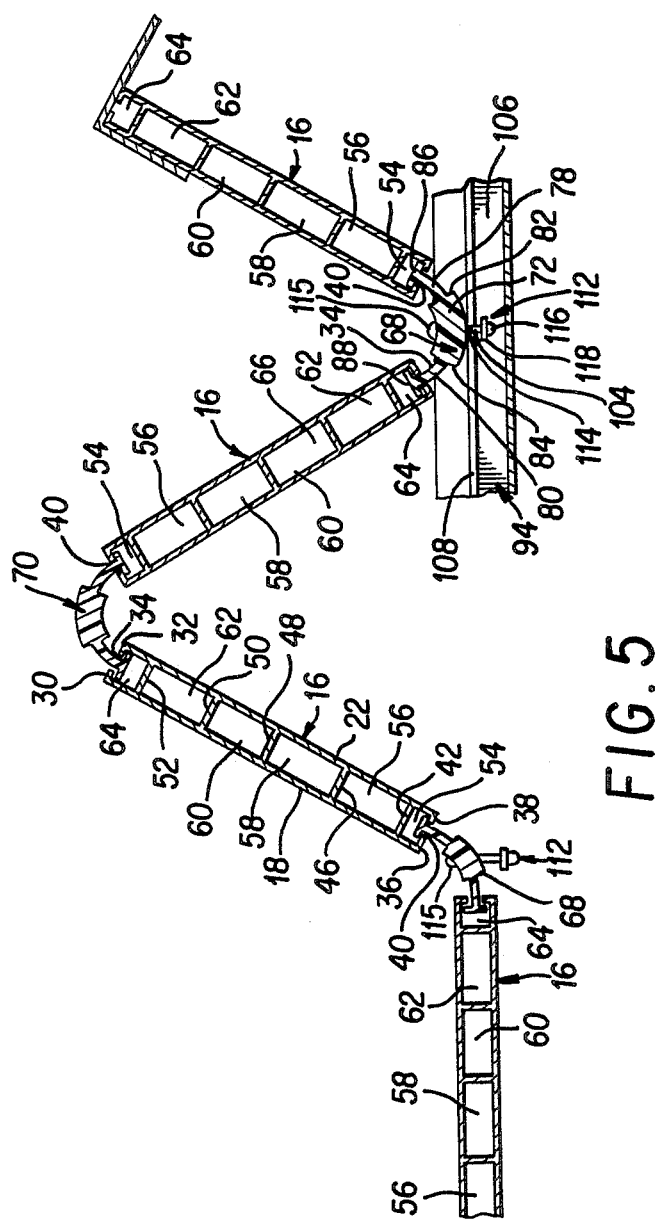
FIG. 5 is a fragmentary longitudinal section through the slat members and the hinge members when partially folded and showing the slidable connection between one of the alternating hinge members and one of the guide channels.

The hinge members are flexible and resilient as may be observed by comparing FIG. 3, where the hinge members are flat, and FIG. 5 where they are curved. The hinge members thus permit folding of the cover assembly. FIG. 5 illustrates a portion of the cover assembly partly folded, while FIG. 2 shows the assembly completely folded.

Figure 2:
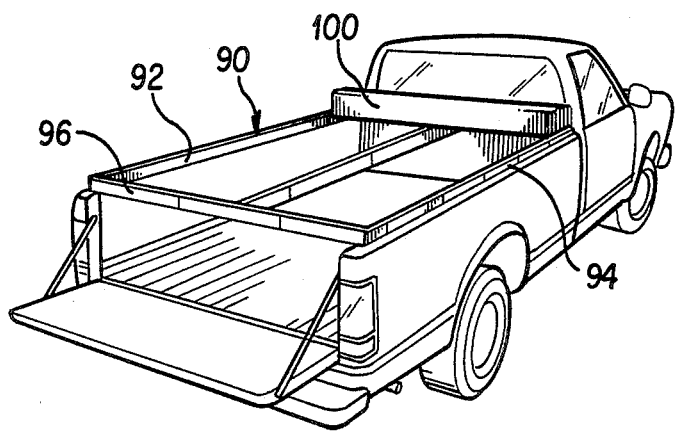
FIG. 2 is a view similar to FIG. 1 showing the cover assembly unfolded.

The cover assembly has a rectangular frame 90 shown generally in FIG. 2. The frame includes a pair of guide channel members 92 and 94, a rear member 96, a front member 98, shown in FIG. 1 and FIG. 3, and a longitudinal centre member 100. The front member 98 is an L-shaped angle section as shown in FIG. 3, while rear member 96 is similar in shape. In the preferred embodiment the centre member 100 is flat in section. The guide channel members 92 and 94 are mirror images of each other. Their structure is best shown in the enlarged fragmentary view of FIG. 4. Each of the guide channel members has an inner portion 102 for slidably receiving sides of the slat members 16 and the hinge members thereon. The inner portion 102 is in the shape of a channel, having a relatively narrow central slot 104 communicating with a more extensive interior cavity 106. The inner part has opposed flanges 108 and 110 on opposite sides of slot 104 which slidably support the slat members and the hinge member to provide guide means therefor. As seen in FIG. 5, which shows a fragment of guide channel 94 with reference numbers identical to those for guide channel member 92, hinge members 68 are provided with retaining means or retainers 112 which slidably connect hinge members 68 to the guide channel members 92 and 94 respectively. The retainers in the preferred embodiment are in the shape of rivets having a shank 114 narrow enough to pass slidably through slot 104 and a head 115 on top of the hinge member. Each retainer has a head 116 and a washer 118 within the cavity 106 of one of the guide channel members 92 or 94. The washer and head 116 are too large to pass through each slot 104, but are small enough to slidably pass long the cavity.

Each of the guide channel members 92 and 94 has an outer portion 120 as shown for member 92 in FIG. 4. The outer portion includes a flange 122 which extends vertically upwards just beyond the top of slat members 16 when the cover is unfolded and the slat members are flat on top of inner portion 102 of each of the guide channel members. The outer portion also includes a longitudinal socket 123 with a partly cylindrical recess 124 communicating outwardly through a slot 126. The recess is less than completely cylindrical because of the slot, but is more than semicylindrical. A drainage channel 127 extends between inner portion 102 and outer portion 120.

Cover assembly 10 also includes a pair of flap members 128 and 130 shown generaly in FIG. 1. These are mirror images and so can be understood by referring only to flap member 128 shown in better detail in FIG. 4. The flap members are angle-shaped in section, rather in the shape of an inverted "L". Each has a flat top 132 on a first flange 133 which is connected perpendicularly to a second flange 134 having a substantially cylindrical end 136 opposite flange 133. The cylindrical end 136 is received within partly cylindrical recess 124 of one of the guide channel members, in this case member 92. The slot 126 is wide enough to permit limited pivoting of the respective flap member as indicated by arrows 138 in FIG. 4. FIG. 4 shows the flap member rotated counterclockwise about partly cylindrical recess 124 so as to clear slat members 16 and permit folding of the cover assembly. In normal use, with the cover assembly unfolded, the flap members 128 and 130 are rotated so their flat tops 132 cover the sides of slat members 16 and hinge members 68 and 70 as shown in FIG. 1. Thus the flap members improve protection from the environment along the sides of the cover assembly and, in addition, prevent lifting of the slat members and hinge members due to airflow at highway speeds.

Referring to FIG. 3, the cover assembly includes a rear angle member 140 connected to the rearmost slat member 16 and shaped to overlap rear member 96 of the frame and the top of the tailgate 142. A weatherstrip retainer 141 connected to the angle member has a slotted cylindrical recess 143 for retaining weatherstrip 145. Weatherstrip 145 has a hollow tube 147 received in recess 143 and a larger tube 149 for pressing against the tailgate of the truck. A hasp 151 mounted on the angle member fits over lock 144 shown in FIG. 1.

The foremost slat member 16, as shown to the right of FIG. 3, is connected to front member 98 of the frame by means of a hanging rail 146 which includes a vertical flange 148 connected to front member 98 by suitable means such as bolts. The hanging rail also includes a cylindrical tube 150 with a longitudinal slot 152 facing foremost slat member 16. This permits the foremost slat member 16 to be connected to the hanging rail 146 by means of a hinge member 70 in the same manner as the hinge members are used to interconnect the slat members.

Although other materials may be employed, the preferred embodiment is substantially made of extruded polyvinyl chloride. The frame and slat members 16 are of a relatively rigid polyvinyl chloride. The hinge members are of a flexible polyvinyl chloride. Rear angle member 140 and hanging rail 146 are aluminum extrusions in the preferred embodiment for security and strength.

Hinge members 70 differ from members 68 because they do not have retainers 112 connected thereto. This permits the folding of the cover assembly. In use, the box 12 of the truck 14 shown in FIG. 1 is uncovered firstly by rotating flap members 128 and 130 away from the slat members, for example counter-clockwise from the point of view of FIG. 4 for flap member 128. Lock 144 is then unlocked if necessary and rear angle member 140 is raised. The slat members and hinge members are then pushed forwardly from the rear resulting in the type of folding shown in FIG. 5. Hinge members 68 are held against guide channel members 92 and 94 because of retainers 112 which slidably engage the guide channel members. Alternating hinge members 70 are free to fold away from the guide channel members as shown in FIG. 5. Thus, as may be observed by comparing FIGS. 5 and 2, when folded the slat members 16 are substantially vertical and the hinge members 68 and 70 form curved loops connecting adjacent slat members. The slat members and hinge members therefore may be stored in a relatively small space at the front of cover assembly 10 allowing maximum access to the interior of box 12.

Figure 6:
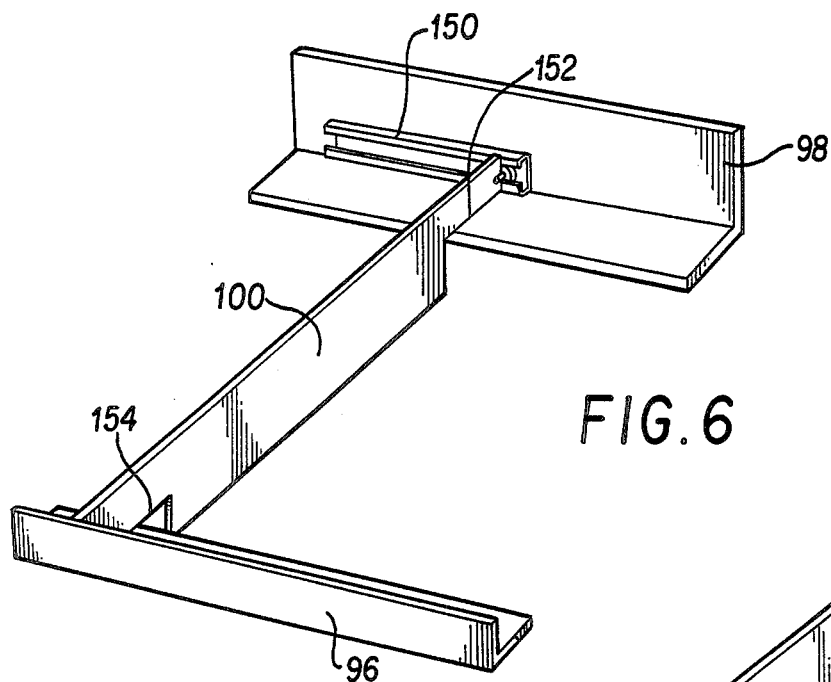
FIG. 6 is a fragmentary perspective showing the centre member of the frame of the cover assembly and its mounts.
Figure 7:
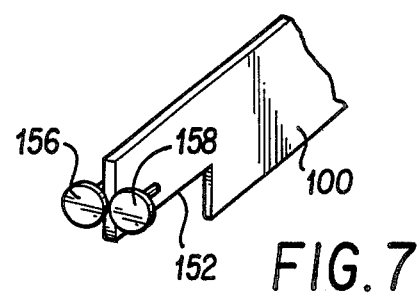
FIG. 7 is a fragmentary perspective of the front and of the centre.

The function of centre member 100 of the frame is to provide support for the slat members and hinge members when the cover assembly is unfolded and the box covered. Preferably the centre member is movable to permit maximum access to the interior. This may be easily accomplished by mounting it slidably on front member 98 and rear member 96 so it can be moved to the side when the assembly is unfolded. Referring to FIG. 6, a guide track 150 is mounted on the inside of front member 98. Hanging rail 146 would be above in this variation. Member 100 has a front cut-away portion 152 for overhanging member 98 and a rear cut-away portion 154 for overhanging rear member 96. Referring to FIG. 7, two spool guides 156 and 158 are connected to the front end of member 100 for slidably engaging guide track 100.

The guide channel members 92 and 94 and the front member 98 of the frame are preferably connected to the top edge of the box of the truck by a permanent, pressure sensitive adhesive. Rear member 96 is preferably made removable by connecting it with such means as slide bolts to the guide channel members.

The above description is by way of preferred example only. The structure may vary without departing from the scope of the invention which is to be interpreted from the following claims.

What is claimed is:

1. A foldable cover assembly comprising: a frame including a pair of parallel guide channel members; a foldable cover on the guide channel members including interconnected, alternating rigid slat members and flexible hinge members, the slat members each having a longitudinal slot extending along each end thereof, each said slot communicating with a more extensive interior cavity, the hinge members each being flexible and resilient and having a centre portion, a relatively thin flange portion extending longitudinally along each end of the centre portion, and an enlarged, elongated portion extending along an outer end of each said flange portion, the flange portions and enlarged portions being shaped so the flange portions can extend through the slots of the slat members while the enlarged portions are retained in the cavities of the slat members; connecting means for connecting every second hinge member to each said guide channel member in a manner to permit sliding along the guide channel members and to prevent lifting of said every second hinge member away from the guide channel members so the slat members and the hinge members are flat against the guide channel members and the cover extends along the lengths of the guide channel members when the cover is unfolded, and the slat members are stacked adjacent each other in a vertical position near one end of the guide channel members and the hinge members form curved loops interconnecting adjacent slat members when the cover is folded.

2. A foldable cover assembly as claimed in claim 1, wherein the slat members have flat top and bottom surfaces and end portions on each side of said slots at right angles to the top and bottom surfaces.

3. A foldable cover assembly as claimed in claim 2, wherein the slat members are hollow with interior ribs extending perpendicular to the top and bottom surfaces, each said cavity extending from one said rib to the end portions.

4. A foldable cover assembly as claimed in claim 1, wherein each hinge member is unitary and flat when undeformed, the centre portion having a flat top and a flat bottom, the flange portions being parallel to the top and the bottom, the enlarged portions being flat and perpendicular to the centre portion and the flange portions.

5. A foldable cover assembly as claimed in claim 4, wherein each said hinge member has sealing means on the enlarged portions for sealing the hinge members within the cavities of the slat members.

6. A cover assembly as claimed in claim 1, further including flap members connected to the guide channel members by hinges and each having a top positioned to overly sides of the cover when unfolded, the hinges being positioned to permit the flap members to swing away from the cover to permit folding thereof.

7. A foldable cover assembly as claimed in claim 6, wherein each of the flap members has a flat top which covers said sides of the slat members and hinge members.

8. A foldable cover assembly as claimed in claim 6, wherein the guide channel members each comprises an elongated member having a longitudinal channel along an inner portion thereof, the channel having a top for slidably receiving the slat members and the hinge members and a relatively narrow central slot extending along the top and communicating with a more extensive interior cavity of the channel.

9. A foldable cover assembly as claimed in claim 8, wherein the connecting means each comprises a pair of retaining members extending from each said every second hinge member, each said retaining member having a first portion near said every second hinge member shaped to project slideably through the slot in one of the channels and an enlarged second portion shaped to move slideably in the interior cavity of the channel and be retained therein.

10. A foldable cover assembly as claimed in claim 8, wherein each said guide channel member has an outer portion with a partially cylindrical recess, each of the flap members having a generally cylindrical end shaped to fit in the recess to form said hinges.

11. A foldable cover assembly as claimed in claim 10, wherein each of the flap members is L-shaped in section, the top being a first flange thereof and the cylindrical end being on a second flange thereof.

12. A foldable cover assembly as claimed in claim 10, wherein each said guide channel member has a drainage channel between the inner portion and the outer portion.

13. A cover assembly as claimed in claim 6, further including a front member extending perpendicularly between the guide channel members at front ends thereof.

14. A cover assembly as claimed in claim 13, further including a rear member extending perpendicularly between the guide channel members at rear ends thereof.

15. A cover assembly as claimed in claim 14, having a flap at a rear end thereof for overlapping the rear member.

16. A cover assembly as claimed in claim 14, further including a longitudinal centre member parallel to the guide channel members and midway therebetween.

17. A cover assembly as claimed in claim 16, further including means for slidably mounting the centre member on the front member and the rear member.

* * * * *